Jan. 16, 1968  N. H. DANKERT  3,364,384
SPEED CONTROLLED SIGNAL SYSTEM FOR DEPICTING DRIVER'S ACTION
Filed May 6, 1966  2 Sheets-Sheet 1
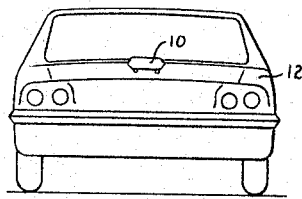
Fig.-1
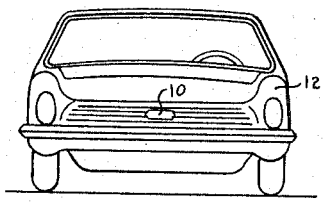
Fig.-2
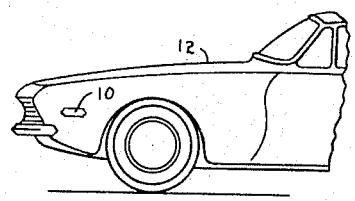
Fig.-3
Fig.-8
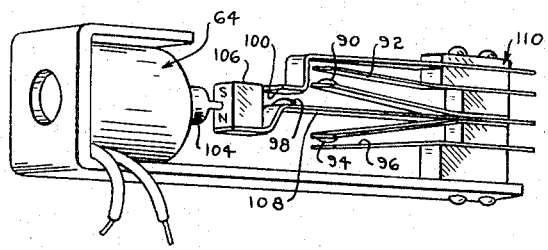
Fig.-9
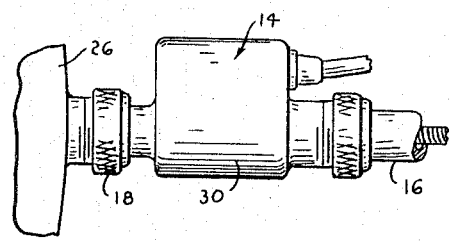
Fig.-10
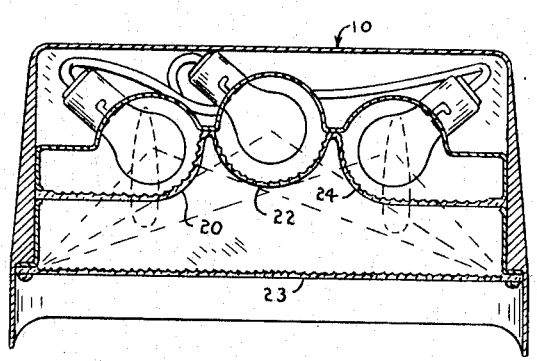
Fig.-11
RAPID DEACCELERATION
BRAKES APPLIED FORCEFULLY
DEACCELERATION WITH
BRAKES APPLIED
DEACCELERATING
MOTION
CONSTANT
SPEED
ACCELERATING
MOTION
INVENTOR.
NORMAN H. DANKERT
BY Walter Lewes
ATTORNEY Jan. 16, 1968  N. H. DANKERT  3,364,384
SPEED CONTROLLED SIGNAL SYSTEM FOR DEPICTING DRIVER'S ACTION
Filed May 6, 1966  2 Sheets-Sheet 2

INVENTOR.
NORMAN H. DANKERT
BY Walter Lenca
ATTORNEY

United States Patent Office 3,364,384
Patented Jan. 16, 1968

3,364,384
SPEED CONTROLLED SIGNAL SYSTEM FOR
DEPICTING DRIVER'S ACTION
Norman H. Dankert, 133 E. Garfield St.,
Michigan City, Ind. 46360
Filed May 6, 1966, Ser. No. 548,169
16 Claims. (Cl. 315—79)

This invention relates generally to information indicating means and more particularly to a circuit for a signal device for vehicles responsive to the motion condition of the vehicle.

The problems to which this invention is directed are those arising from motor vehicle driver reaction, and has particular reference to the problem of time delay of reaction of the follower driver to the motion condition of the vehicle preceding. This problem has become increasingly acute with the increase of vehicular traffic, the high speeds travelled by the automobiles and multilane highways wherein automobiles frequently change lanes and thereby quickly assume a close follow position. This problem, of course, is present with vehicular traffic on single-lane highways and roads since drivers generally find it difficult to maintain the necessary distances between their vehicles to allow for the unexpected or rapid deacceleration of a preceding automobile. The problem of reaction delay of following vehicles is particularly acute with vehicles travelling in convoy fashion such as with military vehicles. Another problem that this invention is concerned with is that of anticipating the action of an approaching vehicle, either from the rear or side. It frequently occurs that a driver of a vehicle is concerned with the motion condition of a following vehicle or a vehicle approaching from a side street so that he may anticipate the ultimate motion condition when such vehicles are in each other's immediate path.

Accordingly, a principal object of my invention is to provide a simple, rugged, inexpensive and easy to install electro-motive signal device which is immediately and accurately responsive to the motion condition of a vehicle to effect a luminous pattern for visually communicating information regarding the motion condition of the vehicle.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application, in which:

FIGURES 1, 2 and 3 are rear, front and side elevations, respectively, of a motor vehicle showing the signal lights of the present invention mounted thereon at suggested locations for viewing the signal lights from the rear, front and side of the vehicle, respectively, the side elevation shows the motor vehicle in part only;

FIGURE 8 is a detail view of the magnet switch device for the signal lamps of the present invention;

FIGURE 9 is a schematic view of the electric generating unit interposingly connected between the speedometer cable and the speedometer cable drive with parts broken away;

FIGURE 10 is a plan elevation of the lamp mount longitudinally sectioned to show the preferred construction and arrangement of parts thereof; and FIGURE 11 are sketches of the signal device of the present invention showing a sequence of illustrative chromatic combinations as signals for the indicated motion conditions of the vehicle.

Figure 4:
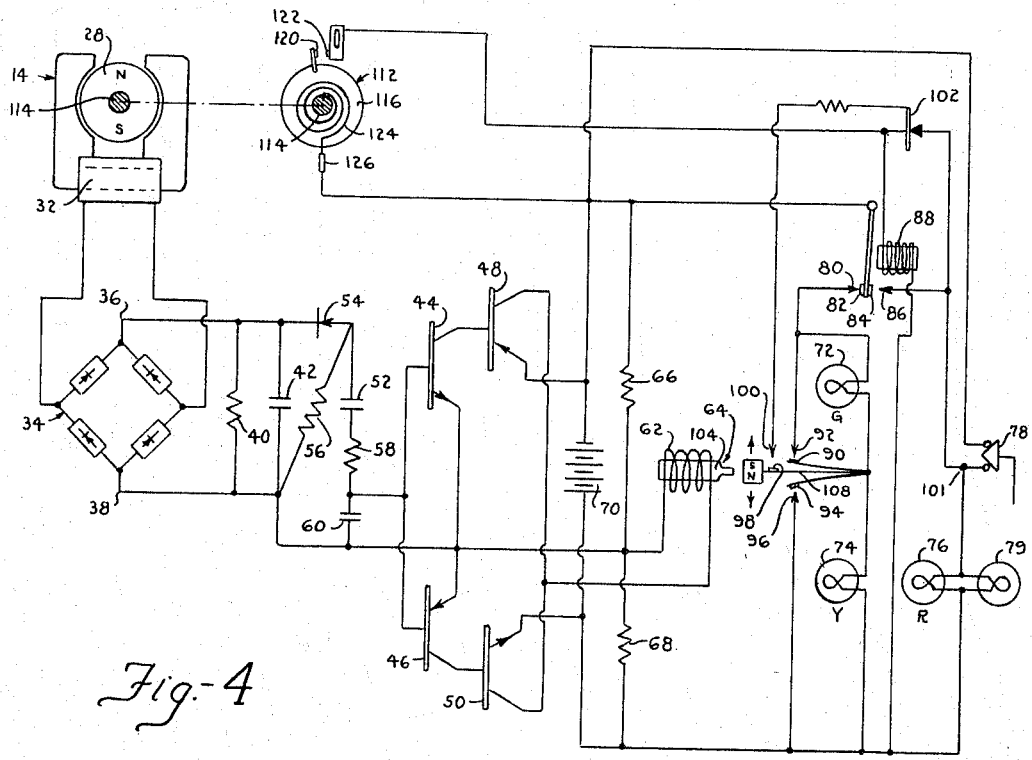
FIGURE 4 is a schematic circuit diagram of the present invention, the magnetic coupling switch is shown axially aligned with the rotating magnet schematically.
Figure 5:
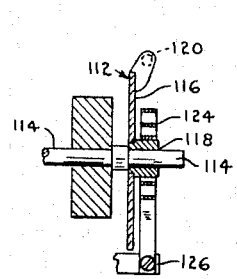
FIGURE 5 is an enlarged view of the magnetic coupling switch sectioned along line 5—5 of FIGURE 6.
Figure 6:
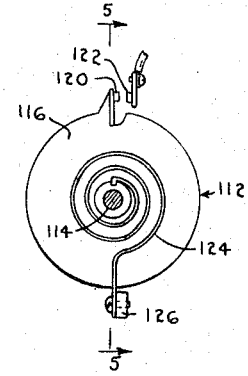
FIGURE 6 is an enlarged front view of the magnetic coupling switch showing the contacts open.
Figure 7:
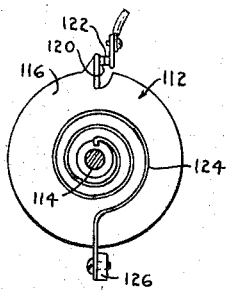
FIGURE 7 is a view similar to FIGURE 6 showing the contacts closed.

In accordance with the general principles of my invention, signal lamp housing 10 is suitably mounted on the rear-facing portion of the automobile 12 as shown in FIGURE 1. FIGURES 2 and 3 illustrate signal lamp housing 10 mounted on the front facing and side facing portions of the automobile 12 if desired. The lamp group of each housing 10 is electrically connected, in a manner more fully described hereinafter, to a rotatable generator device 14 which is mechanically connected to either end of speedometer cable 16. For purposes of illustration, generator device 14 of my invention is interposed between speedometer drive shaft means 18 and speedometer cable 16 of the automobile as shown in FIGURE 9. The circuit of my invention provides means to accomplish the sequential and coincidental illumination of the plurality of lamps which preferably are provided with translucent covering lenses 20, 22, and 24 of different colors such as green, red and yellow, respectively, to signally indicate by chromatic sequential variation a change in speed of the automobile. Numeral 23 designates a non-color translucent lens for diffusing the colored light radiating from one or more of lamps 20, 22 and 24. The forward speed of automobile 12 is translated to a rotary motion at the speedometer drive shaft 18 of the transmission drive train 26 to which speedometer cable 16 is conventionally connected. As shown in FIGURE 9, I connectingly interpose therebetween a generator device 14 which comprises, as shown in FIGURE 4, a rotatable magnet 28 in housing 30 which contains field coil 32 across which an A.C. voltage is developed. Again referring to FIGURE 4, diode rectifier circuit 34 is provided for field coil 32 to convert the A.C. voltage output of field coil 32 to D.C. voltage across the output terminals 36 and 38 of the rectifier circuit. An R-C filter circuit is provided for the pulsating D.C. output of the rectifier circuit 34 comprising resistor 40 and capacitor 42.

The changes of D.C. potential across filter network 40, 42 which charges or discharges capacitor 52 through resistor 58 is the input signal of NPN transistor 44 and PNP transistor 46 which are connected in common emitter complementary symmetry stage, which directly drive PNP transistor 48 and NPN transistor 50, respectively, connected in common collector complementary symmetry stage. The D.C. potential of the input signal is shunted by a capacitor 52 which is isolated by a rectifier diode 54 to cause the charging of capacitor 52. Suitable resistors 56 and 58 are connected across capacitor 52 to control the discharge thereof. The voltage across resistor 58 is further filtered by capacitor 60 which is sufficiently large to provide a fly-wheel effect. The transistor stages amplify the input voltage signal generated by rotating magnet 28 to a level of relay operation. Coil 62 of magnet switch device 64 is connected across the collector circuit common to both output transistors 48 and 50, and voltage divider network comprising resistor 66 and 68 connecting across the automobile electric source means, battery 70 which is also connected to the transistor circuit to provide the required bias voltage.

The lamp circuit of my invention comprises a plurality of signal lamps which for purposes of illustration, I show three in number designated by the numerals 72, 74 and 76 together with letters G, Y and R to indicate radiation therefrom of green, yellow and red light, respectively. Operating circuits are provided for each lamp and the several combinations thereof. Switch 78 is the conventional stop light switch activated by the automobile brake pedal. Lamp 76 is connected in parallel to conventional stop light 79. The lamp circuit also includes a relay switch 88 comprising normally closed contacts 80 and 82, and normally open contacts 84 and 86; contacts 90, 92; 94, 96; and 98, 100 of magnet relay device 64; and silicon controlled rectifier (SCR) switch 102.

Relay device 64 comprises a bar or core 104 electromagnetically coupled to coil 62 which serves to magnetically polarize bar 104. As better illustrated in FIGURE 8, a bar magnet 106 is mounted on flexible stem 108 for oscillatory movement relative to the end of bar 104 from which magnet 106 is slightly spaced. Magnet 106 is mounted on stem 108 so that the N-S polar axis of magnet 106 is perpendicular in the polar axis of bar 104. Stem 108 is mounted in any convenient manner such as on junction base 110. The opposing sides of stem 108 is provided with laterally extending contact elements 90 and 94 which move with stem 108 to make contact with contact members 92 and 96, respectively, also mounted on base 110, dielectrically spaced from stem 108. Contact movement of elements 90 and 94 with contact members 92 and 96, respectively, is controlled by oscillatory movement of magnet 106 causing stem 108 to flexibly pivot from base 110. Contact element 98 is provided on stem 108 to make contact with contact member 100 which is also mounted to base 110 and dielectrically spaced from bar members 92 and 96 and stem 108.

The circuit of my invention further includes a magnetic coupling switch 112. Referring to FIGURES 4, 5, 6 and 7, it will be noted that a preferred construction thereof employs the rotation of magnet 28 of generator device 14. Magnet 28 includes shaft 114, the ends of which are adapted to connect drive shaft 18 and speedometer cable 16 (FIGURE 9). Riding on shaft 114 adjacently spaced from magnet 28 is disc 116 which is provided with a central aperture 118 through which shaft 114 extends for slipping engagement therebetween. Also provided on the peripheral portion of disc 116 is contact lug 120 for making contact with contact element 122 of the circuit. Coil spring 124 is connected at one end thereof to the circuit such as at 126 and the other end of coil spring 124 is anchored to the central portion of disc 116 to provide a current path across switch 112. Current carrying elements of switch 112, that is coil spring 124 and disc 116, are dielectrically spaced by any convenient means from shaft 114.

A further description of my invention is hereinafter provided in conjunction with the operation thereof as follows: Assuming automobile 12 is in motion, generator device 14 mechanically coupling speedometer drive take-off shaft 18 and speedometer cable 16, will operate to generate an A.C. voltage. Rectifier circuit 34 is provided to convert the A.C. voltage to D.C. voltage, which is smoothed by R-C filter network 40 and 42. Due to capacitator 52 being in the signal input circuit of transistors 40 and 46, an input signal will be produced only when the velocity of the automobile, and therefore the velocity of rotating magnet 28 changes. When the velocity is constant, there is no change of potential across capacitor 52 and therefore there will be no signal to the input transistors 44 and 46. An acceleration of the rotating magnet 28 caused by an acceleration of the automobile, will generate an increase in potential across capacitor 52 which can be considered a positive signal. Conversely, a deceleration of the automobile will cause a decrease in potential across capacitor 52 which can be considered a negative signal. When the input signal to the base terminal of NPN transistor 44 and PNP transistor 46 goes positive, the amplifying stage of transistors 44 and 48 conducts, and amplifying stage of transistors 46 and 50 remains non-conductive. Because of the 180° phase reversal in the common emitter configuration, the current of transistor 44 increases which causes transistor 48 to increase collector current to operate relay device 64. When the input signal goes negative, the amplifying stage of transistors 44 and 48 are non-conducting and the amplifying stage of transistors 46 and 50 conducts. The current of transistor 46 increases causing transistor 50 to increase collector current to operate magnet relay device 64.

Automobile battery 70 with resistors 66 and 68 supply bias polarities for transistor operation. The positive and negative input signal to the first and second mentioned amplifying transistor stages will be in the opposite directions, the magnetic field of coil 62 will change polarity with the change in conduction between the first and second amplifying transistor stages. Bar or core 104 magnetically coupled to coil 62 will have the same polar characteristics as coil 62. Contact stem 108 connecting base 110 at one end and the free end carrying magnet 106 with the polarities indicated for transverse movement relative to bar 104 from which it is slightly spaced, is mounted so that no contact is made by contact elements 90, 92; 94, 96; and 98 and 100 while no current is flowing in coil 62.

While the automobile is moving at a constant velocity, there will be no signal to the first or second amplifying transistor stages because though current is generated by rotating magnet 28, there is no change of potential across capacitor 52, and therefore no positive or negative output to provide or cause a magnetic field around coil 62 and bar 104 having either north or south polar characteristics at the end adjacent to magnet 106 depending upon whether the output from the transistor stages is positive or negative. Consequently, as stated above contact stem 108 remains stationary keeping the contact elements associated therewith open. With the constant velocity motion condition of the automobile above described a circuit is completed across battery 70 through normally closed contacts 80 and 82 of relay switch 88, green lamp 72 and yellow lamp 74 which are illuminated to low but equal intensity providing a green-yellow light combination to signally indicate a constant speed motion condition.

If automobile 12 provided with my invention is accelerated, the potential across capacitor 52 is increased during acceleration providing as described heretofore a positive input signal which causes transistors 44 and 48 to conduct and to provide an increase in current through coil 62 which causes a magnetic field to develop around bar 104. If, for example, a positive signal through coil 62 will develop a north polar characteristic at the end of bar 104, bar 104 will attract and repel, respectively, the N-S polar ends of closely spaced bar magnet 106 causing flexible stem 108 to pivot closing contacts 94 and 96 to complete a circuit across battery 70 through normally closed contacts 80, 82 of relay switch 88, green lamp 72, and contacts 94 and 96 resulting in the illumination of green lamp 74 only at high intensity. When automobile 12 no longer is accelerating but assumes a constant speed, there is no change in potential across capacitor 52 and no signal is provided to drive the transistor stages, therefore, the magnetic field of coil 62 and bar 104 collapses removing the N-S polar characteristics of bar 104 allowing contact stem 108 to return to its central position whereby contacts 94 and 96 are open to restore the circuit of my invention to the constant speed condition, that is, the illumination of green lamp 72 and yellow lamp 74.

Upon deceleration of automobile 12, the voltage developed by the rotating magnet is less than the charge across capacitor 52 and the excess potential is allowed to discharge from its constant velocity potential through by-pass circuit path containing resistors 58 and 56. This discharge becomes a negative signal to the input of transistors 46 and 50 causing this second transistor amplifying stage to conduct and to provide an increase in current in the output collector's circuit containing coil 62. Since the flow of current in coil 62 is opposite in direction from the positive signal generated in the output collector's circuit of the first amplifying stage, the polar characteristic at the end of bar 104 will be opposite to that induced by the positive signal, or south, causing magnet 106 to move in the opposite direction to close contacts 90 and 92 completing a circuit across battery 70, through contacts 80, 82 of relay 88, contacts 92 and 90, and yellow lamp 74. Since the circuit of green lamp 72 is shunted out, only yellow lamp 74 will be illuminated at high intensity since the full voltage of the battery is applied to it, emitting yellow light which signals the decelerating motion condition of the automobile. I provide also for rapid deceleration such as that occasioned by the application of brakes. Such rapid deceleration of the automobile results in intensification of the negative input signal correspondingly affecting the south polar strength of bar 104 so as to further move bar magnet 106 in the same direction to momentarily close contacts 98 and 100 completing a circuit across battery 70, through the contacts 80, 82 of relay 88, contacts 92, 90 through stem 103, contacts 98, 100, through SCR switch 102 to initiate conduction therethrough. Closing of contacts 98 and 100 is only momentary since the resiliency of contact stem 103 is such to cause it to spring back promptly opening contacts 98 and 100. This momentary contact is sufficient to initiate conduction through SCR switch 102, which once started allows current to flow therethrough from another source. This other source of current is the brake circuit which includes the conventional stop light 79. The circuit for stop light 79 includes brake operated switch 78 and red lamp 76 connected in parallel thereto. At this time a circuit is completed across battery 70 through brake switch 78, SCR switch 102 by way of junction 101, and relay switch 88 thereby activating relay switch 88 to open contacts 80 and 82 interrupting the circuit of green lamp 72 and yellow lamp 74. Energization of relay switch 88 also closes contacts 84 and 86, completing a circuit to red lamp 76 and stop light 79. This motion condition of the vehicle, that is the application of the brakes so as to cause such rapid deceleration to cause contacts 98 and 100 to close, will cause the normal decelerating signal, that is the yellow lamp 74 to be inoperative in favor of red lamp 76 and the conventional brake light 79.

Magnetic coupling switch 112 is included in the battery circuit to operate relay switch 88 causing contacts 84 and 86 to close and opening contacts 80 and 82 to shunt out the circuit of green lamp 72 and yellow lamp 74. The closing of contacts 84 and 86 completes the circuit across battery 70 through red lamp 76 and stop light 79 maintaining the illumination thereof if brake switch 78 is released. This motion condition of the vehicle will occur when the vehicle is at rest with the switch on or in reverse motion. The circuit is completed across switch 112 by the bias of coil spring 124 which causes disc 116 to slippingly rotate on shaft 114 so as to cause lug 120 to make contact with contact element 122. The return bias of spring 124 will cause the closing of contact 120 of disc 116 and contact 122 of the circuit when magnet 28 ceases rotation. The motion condition of the vehicle at this time is one of rest. Upon resumption of forward speed, magnet 28 will begin to rotate. Disc 112, being closely spaced from magnet 28 on shaft 114 and slippingly mounted thereon and being within the magnetic field of magnet 28, will rotate with magnet 28 to a point allowed by the bias of coil spring 124. This partial rotation of disc 116 within the limit of the bias of coil spring 124 will be sufficient to break the circuit at contacts 120 and 122. I have found that the making and breaking of contacts 120 and 122 occur at a speed between 1 and 2 m.p.h. which provides a sufficient sensitivity.

Referring to FIGURE 11 wherein is illustrated a sequential series of signals, the bottom panel displays a green light indicating accelerating motion of the vehicle. As stated above contacts 120 and 122 of switch 112 of the circuit of my invention are open, contacts 80 and 82 of relay switch 88 are closed, and contacts 94 and 96 of magnet relay device 64 are closed. The next panel indicates a yellow-green combination light of equal but relatively low intensity signalling a constant speed motion condition of the vehicle. During this motion condition, contacts 120 and 122 of switch 112 are open, contacts 80 and 82 of relay switch 88 are closed, and all the contacts associated with magnet relay device 64 are open. The next panel of FIGURE 11 indicates a yellow light which signals a decelerating motion condition of the vehicle. During such a motion condition, contacts 120 and 122 of switch 112 are open, contacts 80 and 82 of relay switch 88 are closed, and contacts 90 and 92 of magnetic relay device 64 are closed. The next panel indicates a red-yellow light combination signalling a deceleration motion condition of the vehicle with the brakes applied. During this motion condition, contacts 120 and 122 of switch 112 are open, contacts 80 and 82 are closed, contacts 90 and 92 are closed, and brake switch 78 is closed. The top panel of FIGURE 11 indicates a red light signalling an extremely rapid deceleration which is normally caused by forceful application of the brakes. During this motion condition of the vehicle, contacts 120 and 122 of switch 112 are open, contacts 90 and 92 are closed, contacts 98 and 100 make closing contact to initiate conduction through SCR switch 102, switch 78 is closed due to application of the brakes, contacts 80 and 82 are open and contacts 84 and 86 of relay switch 88 are closed. The top panel indicating a red light also signals a stationary motion condition of the vehicle such as when the vehicle is stopped even though the brake is released and switch 78 is opened. During such motion condition of the vehicle, contacts 120 and 122 of switch 112 are closed, contacts 80 and 82 are opened, and contacts 84 and 86 of relay switch 88 are closed.

The sensitivity of my invention is such that a signal will change with a change in speed of from 1½ to 2 m.p.h. The circuit of my invention can be more sensitivity adjusted, however, I have found that a change in signal for less than 1½ to 2 m.p.h. would serve no useful purpose and would cause a frequent change in signal which would be more confusing than useful.

Thus it can be seen that the present invention discloses an improvement in vehicular signal devices which enables the signal device to withstand shock without loss of accuracy. The simplicity of the entire structure results in an increased flexibility and adaptability of the signal device which is desirable and advantageous for use in different makes of vehicles.

Although I have described a preferred embodiment of my invention in considerable detail, it will be understood that the description thereof is intended to be illustrative, rather than restrictive, as many details may be modified or changed without departing from the spirit or scope of the invention as set forth in the following claims.

I claim:

1. A circuit for controlling a switch device responsive to a variable speed drive means comprising:

an electric generating means connecting said drive means;
a switch device including,
  a coil for developing a magnetic field, and
  contact means operably responsive to said magnetic field of said coil;
a circuit connecting said coil and said electric generating means including,
  a capacitor,
  a by-pass circuit between said capacitor and said electric generating means for providing a path for said capacitor to discharge,
  an amplifying means having an input circuit connecting said capacitor for amplifying the charging signal across said capacitor,
  a second amplifying means having an input circuit connecting said capacitor for amplifying the discharging signal across said capacitor,
  said first amplifying means having an output circuit connecting said coil for current flow therethrough in one direction, and
  said second amplifying means having an output circuit connecting said coil for current flow therethrough in the opposite direction.

2. The circuit of claim 1 wherein said circuit connecting said coil and said electric generating means further characterized by including a rectifier means in series with said capacitor for allowing the charging of said capacitor by said electric generating means.

3. The circuit of claim 2 wherein said contact means of said switch device is further defined as comprising:
  fixed contacts,
  a movable member having contacts for engaging said fixed contacts, and
  a magnet means mounted on said movable member adjacently spaced from said coil for reactive response to said magnetic field of said coil.

4. The circuit of claim 2, the combination therewith of:
  another circuit connecting said contact means of said switch device,
  said another circuit comprising;
    a load device operably dependent on said variation of said speed drive means, and
    an electric source means for operating said load device.

5. A circuit for controlling a switch device responsive to a variable speed drive means comprising:
an electric generating means connecting said drive means;
a switch device including,
  means for developing a magnetic field, and
  contact means operably responsive to said magnetic field;
a circuit connecting said means for developing said magnetic field and said electric generating means including,
  a capacitor,
  a rectifier means in series with said capacitor for allowing the charging of said capacitor by said electric generating means,
  a by-pass circuit between said capacitor and said electric generating means for providing a path for said capacitor to discharge,
  an amplifying means having an input circuit connecting said capacitor for amplifying the charging signal across said capacitor,
  a second amplifying means having an input circuit connecting said capacitor for amplifying the discharging signal across said capacitor,
  said amplifying means having an output circuit connecting said coil for current flow therethrough in one direction, and
  said second amplifying means having an output circuit connecting said coil for current flow therethrough in the opposite direction.

6. A circuit for controlling a switch device responsive to a variable speed drive means comprising;
an electric generating means connecting said drive means;
a switch device including,
  a coil means for developing a magnetic field, and
  contact means;
a circuit connecting said coil and said electric generating means including,
  a rectifier circuit connecting said electric generating means for providing a charging branch and a return branch,
  a capacitor in said charging branch,
  a rectifier means in series with said capacitor for allowing only charging of said capacitor by said electric generating means,
  a by-pass circuit connecting said capacitor and said return branch of said rectifier circuit for providing a path for said capacitor to discharge, by-passing said rectifier means,
  an amplifying means having an input circuit connecting said capacitor for amplifyng the charging signal across said capacitor,
  a second amplifying means having an input circuit connecting said capacitor for amplifying the discharging signal across said capacitor,
  said amplifying means having an output circuit connecting said coil for current flow therethrough in one direction, and
  said second amplifying means having an output circuit connecting said coil for current flow therethrough in the opposite direction.

7. A circuit for a signal device for a vehicle to indicate the motion condition of said vehicle wherein said vehicle includes a variable speed means to register said motion condition, an electric source means, and a circuit including said electric source means, stop signal lights and a brake pedal switch for energizing said stop signal lights, comprising;
an electric generating means connecting said drive means for providing variable voltages which vary directly with the revolutional velocities of said drive means of said vehicle;
a relay switch device including,
  a coil for developing a magnetic field, and
  contact means operably responsive to said magnetic field of said coil;
a circuit connecting said coil of said relay switch device and said electric generating means including,
  a rectifier circuit connecting said electric generating means for providing a charging branch and a return branch for said circuit,
  a capacitor in said charging branch,
  a rectifier means in series with said capacitor for allowing only charging of said capacitor by said electric generating means,
  a by-pass circuit connecting said capacitor and said return branch of said rectifier circuit for providing a path for said capacitor to discharge, by-passing said rectifier means,
  an amplifying means having an input circuit connecting said capacitor for amplifying the charging signal across said capacitor,
  a second amplifying means having an input circuit connecting said capacitor for amplifying the discharging signal across said capacitor,
  said amplifying means having an output circuit connecting said coil for current flow therethrough in one direction, and
  said second amplifying means having an output circuit connecting said coil for current flow therethrough in the opposite direction.

8. The circuit of claim 7 further characterized by said contact means of said relay switch device comprising;
  fixed contacts, a movable member having contacts for alternately engaging said fixed contacts, and a magnet means mounted on said movable member adjacently spaced from said coil and being reactively responsive to said magnetic field to move said movable member.

9. The circuit of claim 8, the combination therewith of;

a circuit connecting said contacts of said movable member of said switch device, said circuit comprising;
said electric source means,
at least two signal lamps, and
a shunt circuit across each of said lamps and said fixed contacts of said relay switch device.

10. In the circuit of claim 9, the circuit connecting said contacts of said movable member of said relay switch device being further defined as including switch means for said signal lamps.

11. The circuit of claim 10, the combination therewith of;

said circuit including said electric source means, stop signal lights and said brake pedal switch for energizing said stop signal lights, another circuit connected in series with said brake pedal switch and in parallel with said stop signal lights of said circuit, and said another circuit including relay means to operate said switch means for said signal lamps.

12. The circuit of claim 11 wherein said another circuit further characterized by being provided with a controlled rectifier means, and said controlled rectifier means connecting one of said fixed contacts of said contact means of said relay switch device.

13. The circuit of claim 12, the combination therewith of;

an additional circuit connecting said electric source means and said relay means of said another circuit, and said additional circuit including a switch actuated by said drive means to control the operation of said additional circuit and said relay means of said another circuit.

14. The circuit of claim 13, the combination therewith of;

still another circuit connecting said electric source means and said another circuit, said still another circuit including said switch means for said signal lamps, and said switch means operating to alternately interrupt said still another circuit and said signal lamps.

15. A circuit for a signal device for a vehicle to indicate the motion condition of said vehicle wherein said vehicle includes a drive means actuated by the motion of said vehicle, an electric source means, and a circuit including stop signal lights and a brake pedal switch for energizing said stop signal lights, comprising;

an electric generating means connecting said drive means for providing voltages in a circuit the magnitudes of which vary directly with the revolutional velocities of said drive means of said vehicle;

a relay switch device comprising,
a coil for developing a magnetic field, and
contact elements, said contact elements including,
fixed contact members,
movable contact members for engaging said fixed contact members, and
a fixedly oriented magnet mounted on one of said movable contact members adjacently spaced from a polar end of said coil for responsive reaction to said magnetic field of said coil;

a circuit connecting said coil of said relay device and said electric generating means including, a rectifier circuit connecting said electric generating means for providing a charging branch and a return branch for said circuit, a capacitor in said charging branch, a rectifier diode means in series with said capacitor to allow only charging of said capacitor by said electric generating means, a by-pass circuit between said capacitor and said circuit of said return branch of said rectifier circuit to provide a path for said capacitator to discharge, a transistor stage having an input circuit connecting said capacitator for amplifying the charging signal across said capacitor, a second transistor stage having an input circuit connecting said capacitor for amplifying the discharging signal across said capacitor, said first transistor stage having an output circuit connecting said coil for current flow therethrough in one direction, and said second transistor stage having an output circuit connecting said coil for current flow therethrough in the opposite direction;

a circuit across said electric source means of said vehicle including, a pair of signal lamps, said movable contact member of said relay switch device, switch means for controlling current flow through said circuit, and shunt circuits across said lamps and said fixed contact members of said relay device;

a second circuit across said electric source means of said vehicle including, a switch coupled to said drive means actuated by said drive means of said vehicle to open said second circuit, and a relay for opening said switch means of said first mentioned circuit across said electric source means for interrupting said circuit to said pair of signal lamps when said switch of said second circuit is closed;

a third circuit across said electric source means including, said stop signal lights, and said switch means of said first circuit across said electric source means, said switch means being operated by said relay of said second circuit to alternately interrupt said second circuit and said third circuit;

a fourth circuit connecting said relay of said second circuit and said circuit of said vehicle including stop signal lights and a brake pedal switch for energizing said stop signal lights, said fourth circuit including a controlled rectifier switch for blocking current to said relay when said brake pedal switch is closed; and a fifth circuit connecting said controlled rectifier switch and one of said fixed contact members of said relay switch device to initiate conduction through said rectifier switch through said fourth circuit.

16. The circuit of claim 15 in which said electric generating means is further characterized by comprising;

a rotatably supported shaft means for connecting said drive means, and a magnet mounted on said shaft means for rotation therewith; and the combination therewith of;

said switch of said second circuit further characterized by comprising, a planular member formed of metallic material, said planular member having a central opening for receiving therethrough said shaft means, said planular member being adjacently spaced from said magnet on said shaft means slippingly engaging said shaft means, spring means connecting said second circuit and said planular member for current conduction, and contact means on said planular member for closing said second circuit.

References Cited

UNITED STATES PATENTS

| | | | |
|---|---|---|---|
| 2,128,769 | 8/1938 | Finnell | 315—79 X |
| 2,572,144 | 10/1951 | Healy | 315—79 |
| 2,632,152 | 3/1953 | Smith | 315—79 X |
| 3,109,158 | 10/1963 | Coombs | 340—66 |

JAMES W. LAWRENCE, *Primary Examiner.*

C. R. CAMPBELL, *Assistant Examiner.*